United States Patent
Itoh et al.

[11] Patent Number: 5,178,971
[45] Date of Patent: * Jan. 12, 1993

[54] SUPPORTED PLATINUM QUATERNARY ALLOY ELECTROCATALYST

[75] Inventors: Takashi Itoh, Ichikawa; Katsuaki Katoh, Matsudo; Shinji Kamitomai, Ichikawa, all of Japan

[73] Assignee: N.E. Chemcat Corporation, Tokyo, Japan

[*] Notice: The portion of the term of this patent subsequent to Jun. 18, 2008 has been disclaimed.

[21] Appl. No.: 736,057

[22] Filed: Jul. 26, 1991

[30] Foreign Application Priority Data

Jul. 31, 1990 [JP] Japan ................ 2-201140

[51] Int. Cl.$^5$ ............... H01M 4/92; B01J 23/40
[52] U.S. Cl. ..................... 429/40; 429/44; 502/326
[58] Field of Search ............ 429/44, 40; 502/326

[56] References Cited

U.S. PATENT DOCUMENTS

| | | | |
|---|---|---|---|
| 3,468,717 | 9/1969 | Waters et al. | 429/40 |
| 5,024,905 | 6/1991 | Itoh et al. | 429/44 |

FOREIGN PATENT DOCUMENTS

| | | |
|---|---|---|
| 0355853 | 2/1990 | European Pat. Off. |
| 62-163746 | 7/1987 | Japan |
| 2185347 | 7/1987 | United Kingdom |

Primary Examiner—Olik Chaudhuri
Assistant Examiner—M. Nuzzolillo
Attorney, Agent, or Firm—Wenderoth, Lind & Ponack

[57] ABSTRACT

A platinum alloy electrocatalyst comprising an electrically conductive carrier and a platinum-cobalt-nickel-copper quaternary solid solution alloy dispersed in and deposited on the carrier, composed of 40-70 atomic % of platinum, 9-27 atomic % of cobalt, 9-27 atomic % of nickel and 9-27 atomic % of copper; and an electrode for acid electrolyte fuel cell, comprising said platinum alloy electrocatalyst, a water-repellent binder and an electrically conductive and acid-resistant supporting member to which the electrocatalyst and the binder are bonded.

6 Claims, 2 Drawing Sheets

O   Pt/Co/Ni/Cu

○ Pt/Co/Ni/Cu

● Pt
○ Co/Ni/Cu

A : CATHODE CATALYST  C-2    (ELECTRODE E-2)
B : CATHODE CATALYST  C-20*  (ELECTRODE E-20*)
C : CATHODE CATALYST  C-15*  (ELECTRODE E-15*)
D : CATHODE CATALYST  C-16*  (ELECTRODE E-16*)
E : CATHODE CATALYST  C-19*  (ELECTRODE E-19*)
F : CATHODE CATALYST  C-1*   (ELECTRODE E-1*)

SUPPORTED PLATINUM QUATERNARY ALLOY ELECTROCATALYST

BACKGROUND OF THE INVENTION

1. Field of the Invention

The present invention relates to a platinum alloy electrocatalyst and an electrode containing the catalyst for use in an acid-electrolyte fuel cell.

2. Description of the Prior Art

Fuel cells are an electrochemical device for directly converting a chemical energy generated from an oxidation-reduction reaction of a fuel such as hydrogen or hydrocarbon and an oxidizer such as oxygen gas supplied thereto, into a low-voltage direct current. They are generally comprised of a fuel electrode(anode), an oxidizer electrode (cathode), an electrolyte interposed between the electrodes, and means for separately supplying a stream of the fuel and a stream of the oxidizer to the anode and the cathode, respectively.

An electrocatalyst is used in the anode and the cathode, and in operation, the fuel supplied to the anode is oxidized on the electrocatalyst in the presence of the electrolyte to release electrons. On the other hand, the oxidizer supplied to the cathode is reduced on the electrocatalyst in the presence of the electrolyte while consuming the electrons supplied from the anode via an external circuit. At this time, the current flowing through the external circuit is utilized as power under a fixed load.

Currently, a phosphoric acid fuel cell is thought to be the nearest to commercial use. However, the electrocatalyst used therein has long had two major problems; that is, the activation polarization of the oxygen reduction reaction at the cathode is far greater than that of the hydrogen oxidation reaction at the anode, and moreover, in the coexistence of the electrolyte at the high temperatures of 190°-210° C. and oxygen as an oxidizer, dissolution and sintering of active metal readily proceed, resulting in deterioration of activity.

In recent years, in order to develop a fuel cell having a high efficiency, a long life and a low cost, studies have been made to develop catalysts comprising an electrically conductive carbon powder carrier and a platinum-base metal multi component alloy deposited thereon, such as supported platinum-chromium-cobalt ternary alloy catalyst (U.S. Pat. Nos. 4,447,506 and 4,711,829), supported platinum-cobalt-nickel ternary alloy catalysts (Japanese Laid-Open Patent Publication No. 8851/1986), supported platinum-iron-cobalt ternary alloy catalyst (Japanese Laid-Open Patent Publication No. 163,746/1987), supported platinum-copper binary alloy catalyst (Japanese Laid-Open Patent Publication No. 269,751/1987) and supported platinum-chromium-gallium ternary alloy catalyst (U.S. Pat. No. 4,880,711).

However, none of these prior art catalysts satisfies both of the high activity and long life required by practical fuel cells, and there still remains room for improvement.

SUMMARY OF THE INVENTION

It is an object of the present invention to provide a electrocatalyst having a higher activity and a longer life than the prior art electrocatalysts.

It is also an object of the present invention to provide an electrode for acid-electrolyte fuel cell, using such an electrocatalyst.

The first object can be achieved according to this invention by a platinum alloy electrocatalyst comprising an electrically conductive carrier and a platinum-cobalt-nickel-copper quaternary solid solution alloy dispersed in and deposited on the carrier, composed of 40-70 atomic % of platinum, 9-27 atomic % of cobalt, 9-27 atomic % of nickel and 9-27 atomic % of copper.

The second object can be achieved according to this invention by an electrode for acid electrolyte fuel cell, said electrode comprising a platinum alloy electrocatalyst, a water-repellent binder and an electrically conductive and acid-resistant supporting member to which the electrocatalyst and the binder are bonded, said electrocatalyst comprising an electrically conductive carbon powder carrier and a platinum-cobalt-nickel-copper quaternary solid solution alloy dispersed in and deposited on the carrier, composed of 40-70 atomic % of platinum, 9-27 atomic % of cobalt, 9-27 atomic % of nickel and 9-27 atomic % of copper.

DETAILED DESCRIPTION OF THE PREFERRED EMBODIMENTS

Figure 1:
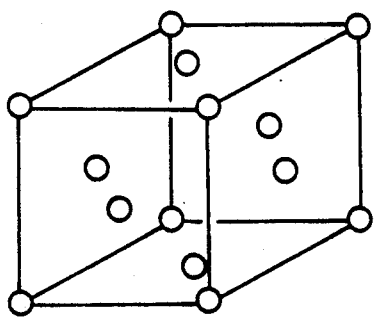
FIG. 1 shows the unit lattice structure of a platinum-cobalt-nickel-copper quaternary face-centered cubic disordered alloy.

The present inventors, in order to solve the above-described problems of the prior art, extensively studied the element combinations, compositions and structures of alloys having a catalytic activity. As a result, they found that supported platinum-cobalt-nickel-copper quaternary alloy catalyst, when used as an electrocatalyst for acid-electrolyte fuel cell, have a higher activity and a longer life than all conventional multi-component alloy catalysts. This finding has led to the present invention.

In the present specification, the catalytic activity for electrochemical oxygen reduction reaction is evaluated by the maximum current density ($mA/cm^2$ of electrode area) which an oxygen half cell shows at +900 mV vs. a reversible hydrogen reference electrode (RHE; the same is applied hereinafter). The quotient obtained by dividing the catalytic activity by a platinum amount loaded per unit electrode area is referred to herein as mass activity (mA/mg Pt). The quotient obtained by dividing the mass activity by a metal surface area ($m^2/g$ Pt) is referred to herein as specific activity ($\mu A/cm^2$ Pt).

The metal surface area is expressed by an electrochemical metal surface area, EC.MSA ($m^2/g$ Pt) obtained by measuring the amount of electricity in the course of hydrogen adsorption on a metal surface in the cathodic sweeps of cyclic voltammetry.

The platinum alloy electrocatalyst of the present invention is formed from fine particles of a platinumcobalt-nickel-copper quaternary solid solution alloy comprising platinum, cobalt, nickel and copper, and an electrically conductive carrier, for example an electrically conductive carbon powder carrier, in and on which the fine particles are dispersed and deposited.

In the present invention, the preferable composition range of the platinum-cobalt-nickel-copper quaternary solid solution alloy is 40–70 atomic % for platinum, 9–27 atomic % for cobalt, 9–27 atomic % for nickel and 9–27 atomic % for copper.

In the present invention, the alloy denotes a substitutional solid solution alloy.

In general, substitutional solid solutions formed of platinum and other elements can be obtained in various crystal structures depending upon the types and proportions of the other elements. Unalloyed platinum is face-centered cubic (f.c.c), and its X-ray diffraction (XRD) pattern has no diffraction peak at lower diffraction angles $2\theta$ than that of the main diffraction peak (111). Even in platinum solid solution alloys, the Bravais lattices of disordered alloys resulting from quite random substitution of the lattice point of platinum by other elements remain face-centered cubic on an average, and show no diffraction peak at the lower diffraction angle $2\theta$ side of (111) in their XRD patterns.

The XRD of ordered alloys of $L_{12}$ type ($Pt_{13}Fe$ type) in which the second metal component predominantly occupies lattice points (000) and platinum predominantly occupies face centers ($\frac{1}{2}$, $\frac{1}{2}$, 0) shows a diffraction pattern of a primitive cubic lattice. In such ordered alloys, new diffraction peaks, i.e. ordering diffraction peaks, (100) and (110) occur at the lower diffraction angle side of the main diffraction peak (111).

Figure 2:
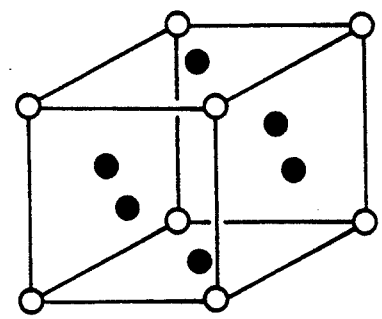
FIG. 2 shows the unit lattice structure of a platinum-cobalt-copper quaternary $L_{12}$ type cubic ordered alloy.

The platinum-cobalt-nickel-copper quaternary alloy within the composition range of the present invention could include a disordered face-centered cubic alloy (see (FIG. 1), an ordered cubic $L_{12}$ type [$Pt_3(Co/Ni/Cu)_1$type] alloy (see FIG. 2) and a mixture thereof.

The lattice constant a of a cubic alloy within the desirable composition range of the catalyst of the present invention varies from the f.c.c. lattice constant of unalloyed platinum, a=3.923 Å to the f.c.c. lattice constant of cobalt, a=3.555 Å, or to the f.c.c. lattice constant of nickel, a=3.524 Å, or to the f.c.c. lattice constant of copper, a=3.615 Å. depending upon its composition. Thus, the above alloy has a lattice constant a in the approximately range of 3.740–3.860Å.

With regard to the proportion of the supported metals in the platinum-cobalt-nickel-copper quaternary alloy catalyst of the present invention, if the proportion of at least one of the cobalt, nickel and copper elements is less than 9 atomic %, or the proportion of platinum exceeds 70 atomic %, the effect of adding cobalt, nickel and copper on the activity of the catalyst does not appear markedly, and the resulting catalyst only shows an activity equivalent to that of a catalyst comprising unalloyed platinum, that of a platinum-cobalt, platinum-nickel or platinum-copper binary alloy catalyst, or that of a platinum-cobalt-nickel or platinum-nickel-copper or platinum-cobalt-copper ternary alloy catalyst.

Even if the proportion of each of cobalt, nickel and copper is at least 9 atomic % but if the proportion of at least one of them exceeds 27 atomic % and the proportion of platinum is at most 55 atomic %, or even if the proportion of each of cobalt, nickel and copper is 9–27 atomic % but if the proportion of platinum is less than 40 atomic %, inneglible amounts of cobalt, nickel and/or copper dissolve in the acid electrolyte and disintegration of the alloy phase occurs to reduce the stability of the catalyst.

The composition range which brings about both of the increased catalytic activity and the increased catalyst stability is 40–70 atomic % for platinum, 9–27 atomic % for cobalt, 9–27 atomic % for nickel and 9–27 atomic % for copper.

Preferably, the platinum-cobalt-nickel-copper alloy of the present invention is deposited on an electrically conductive powder carrier in a highly dispersed state having a metal surface area of at least 30 m$^2$/g, desirably at least 50 m$^2$/g. If the metal surface area is less than 30 m$^2$/g, the catalytic activity per unit weight of alloy is insufficient, and such a catalyst is not economical.

An electrically conductive carbon powder is preferred as the carrier material for supporting the alloy. For example, a conductive carbon black powder, an acetylene black powder or a graphite powder may be used. Specific examples include oil furnace black sold under the tradename Vulcan XC-72R and XC-72 (products of Cabot Corporation), Conductex 975 (a product of Columbian Chemicals Co.), and acetylene black sold under the tradename Shawinigan Black (a product of Gulf Oil Corporation). Vulcan XC-72 or Conductex 975 is desirably heat-treated at high temperatures in vacuum or in an inert gas atmosphere to perform a partial graphitization treatment and thereby to increase corrosion resistance as a carrier of electrocatalyst used under highly corrosive conditions in which an acid electrolyte at high temperatures and an oxidizer such as oxygen are present.

The carrier material generally has a BET specific surface area of 60–250 m$^2$/g and an average particle diameter of 0.1–50 microns.

In the supported platinum alloy electrocatalyst of the present invention, the amount of platinum alloy loaded on the carrier is usually 0.1–35% by weight, preferably 5–25% by weight, based on the total weight of the carrier and the platinum alloy. If its loading amount exceeds 35% by weight, the degree of alloy dispersion on carrier relatively decreases, and no improvement in performance is obtained in spite of the increase in the amount of the alloy used, and the economic advantage of using the carrier is reduced. On the other hand, when the loading amount of alloy on catalyst is extremely lowered, there is an upper limit to the degree of alloy dispersion. If the loading amount of alloy is extremely lowered, the activity per unit catalyst weight decreases. Consequently, a large amount of the catalyst becomes necessary, and it is not desirable.

The amount of alloy loaded on carrier is determined in view of the balance between (a) the cost of intended catalyst and (b) the average power generation efficiency during life time, of a fuel cell constituted with an electrode comprising said catalyst.

The supported alloy electrocatalyst of the present invention can be prepared, for example, by the following procedure. First, a powdery carrier material such as conductive carbon black is contacted with an aqueous solution or aqueous suspension (slurry) of compounds of the metal components constituting the alloy, to allow the carrier to adsorb the metal compounds or their ions or to be impregnated with the metal compounds or their ions. Then, while the slurry is stirred at a high speed, a diluted aqueous solution of a suitable fixing agent such as ammonia, hydrazine, formic acid or formalin is slowly added dropwise, and the metal components are dispersed in and deposited on the carrier as insoluble compounds or as partly reduced fine metal particles.

As the platinum compounds, there may be used acids or salts such as divalent or tetravalent chloroplatinic acid, chloroplatinic acid salts and solubilized $H_2Pt(OH)_6$.

Examples of the cobalt compounds are cobalt chloride, cobalt nitrate and cobalt sulfate. Examples of the nickel compounds are nickel chloride, nickel nitrate and nickel sulfate, Examples of the copper compounds are cuprous chloride, cupric chloride, cupric nitrate and cupric sulfate.

In depositing these metal compounds on the carrier, a method of simultaneous deposition of four components may be applied by using a mixed solution of four compounds of platinum, cobalt, nickel and copper. Alternatively, there may be applied various types of multi-step deposition methods, which comprise, for example, preparing a supported platinum catalyst having only platinum deposited thereon, and thereafter, simultaneously depositing cobalt, nickel and copper on it, or first loading cobalt, then loading nickel and finally loading copper.

However, because of the convenience of operation and the ease of controlling the loading amounts of the individual metal components, a two-step deposition method comprising simultaneously loading three components of cobalt, nickel and copper on a supported platinum catalyst prepared previously is practical.

The slurry of the catalyst precursor having platinum, cobalt, nickel and copper deposited thereon in a dispersed state is filtered and dried in a stream of nitrogen.

Then, the dried product is heated for reduction and alloying in a hydrogen atmosphere or in an atmosphere of an inert gas containing hydrogen. Even by heat treatment in an inert gas containing no hydrogen or in vacuum, reduction and alloying occur to some extent with the help of the reducing action of the carbon material as the carrier. However, the degree of this alloying is frequently insufficient, and the resulting catalyst, in many cases, exhibits no sufficient catalytic activity.

Generally, alloying of the loaded components requires a treatment at certain high temperatures.

The platinum-cobalt-nickel-copper quaternary system within the composition range of the present invention hardly gives rise to solid solution alloying at a temperature of 600° C. or below. The formation of a solid solution alloy occurs only at 600° C. or above. The product formed at a relatively low temperature region from 600° C. to 850° C. is a face-centered disordered alloy. The formation of a cubic ordered alloy requires a high-temperature treatment at 850° C. to about 1,050° C., preferably 900° to 1,000° C. The time during which the above system is to be held at the above temperature is 30 minutes to 2 hours.

A heat treatment at an excessively high temperature for a long period of time should be avoided because it grows the crystallite size of the alloy and decreases the metal surface area of the resulting catalyst.

The optimum temperature and time for the alloying treatment depend upon the particle sizes and the degree of dispersion of the metals or their compounds deposited on the catalyst precursor before reduction and alloying. When the particle diameters are small and the components are highly dispersed, sufficient alloying proceeds at lower temperatures within a shorter period of time to give an alloy having a small crystallite size, in a highly dispersed state.

The preferred alloy crystallite diameter of the quaternary alloy in accordance with the present invention is not more than 100 Å, desirably not more than 60 Å. To obtain such fine crystallites, the slurry concentration, the rate of dropwise addition of the fixing agent, the stirring speed in the loading step and the heat-treatment temperature and time in the reduction and alloying step should be controlled so that the particle diameters of the metals or their compounds loaded on the catalyst precursor are not more than 50 Å, desirably not more than 30 Å.

The preferred crystal structure, i.e. cubic crystal ordering taken by the alloy of the present invention is unique to the particular composition range of the platinum-cobalt-nickel-copper system. Any of the platinum-cobalt, platinum-nickel and platinum-copper binary alloys or any of platinum-cobalt-nickel, platinum-nickel-copper and platinum-cobalt-copper ternary alloys gives no cubic crystal ordering but gives a disordered alloy. In contrast, the platinum-cobalt-nickel-copper quaternary system within the composition range of the present invention gives a cubic ordered alloy relatively easily at temperatures of 850° C. or above.

The oxygen reduction mass activity of the platinum-cobalt-nickel-copper quaternary alloy catalyst of the present invention is higher than any of the multi-component alloy catalysts previously reported, and is at least 2.2 times that of a catalyst of unalloyed platinum supported on the same carrier.

The platinum-cobalt-nickel-copper quaternary cubic ordered alloy catalyst, as compared with the quaternary disordered alloy catalyst of the same composition, has a smaller metal surface area but has a higher oxygen reduction specific activity and higher catalyst stability.

Further, the platinum-cobalt-nickel-copper quaternary alloy catalyst of the present invention has higher stability than any of the multi-component alloy catalysts reported previously. A phosphoric acid fuel cell using the quaternary alloy catalyst of the present invention as the cathode catalyst shows a significantly small decay rate of cell terminal voltage when subjected to continuous operation over a long period of time.

The decay rate of terminal voltage of a fuel cell using, as the cathode, the supported platinum-cobalt-nickel-copper quaternary alloy catalyst of the present invention is ⅓ or less of that of a catalyst of unalloyed platinum supported on the same carrier.

The electrode of the present invention for acid electrolyte fuel cell using such a platinum alloy catalyst will now be described.

The fuel cell electrode is obtained by bonding the supported platinum-cobalt-nickel-copper quaternary ordered alloy catalyst and a water-repellent binder (e.g. polymer binder such as polytetrafluoroethylene, polyfluoro-ethylene-propylene or trifluoroalkoxypolyethylene) to an electrically conductive and acid-resistant supporting member such as graphite paper or metal (e.g. tantalum or niobium) screen previously subjected to a water-repelling treatment, and is especially useful as an oxygen reduction cathode for a phosphoric acid fuel cell. The water-repellent binder is required in order to bond the catalyst layer to the conductive supporting member, and also render the catalyst layer sufficiently able to diffuse a reactant gas such as hydrogen or oxygen or a product gas such as water in the electrolyte, and to form a three-phase interface of gas, liquid and solid.

The electrode of the present invention may be fabricated, for example, by the following procedure.

First, a supported platinum-cobalt-nickel-copper quaternary alloy catalyst is produced as above. The resulting catalyst powder is mixed with a water-repellent binder consisting of a polytetrafluoroethylene suspension (e.g. a product of Du Pont Company under the tradename of TFE-30) or the other acid-resistant polymer material to form a homogeneous suspension. The homogeneous suspension of the catalyst and the water-repellent binder is spread by a suction filtration method, a spraying method, a roll coating method, etc. on a graphite paper as a supporting member previously subjected to a water-repelling treatment with an acid-resistant polymer material. The resulting material is then calcined in an atmosphere of an inert gas.

Desirably, the platinum alloy is present on the supporting member just in a catalytically effective amount. The catalytically effective amount generally corresponds to about 0.1–2 mg, preferably about 0.2–1.5 mg, more preferably about 0.5–1.0 mg of the platinum-cobalt-nickel-copper alloy per cm$^2$ of the geometrical surface area of the electrode supporting member.

The above electrode of the present invention can be utilized as a general gas diffusing electrode such as button battery cell electrode, gas sensor electrode and electrolytic cell, but is especially preferable as an electrode for acid electrolyte fuel cell. Examples of the electrolyte used in such a fuel cell include sulfuric acid, hydrochloric acid, and various superacids such as trifluoromethanesulfonic acid, difluoromethanedisulfonic acid and polytrifluoroethylenesulfonic acid, in addition to phosphoric acid.

The following examples and comparative examples illustrate the present invention more specifically. It should be understood however that the present invention is not limited to these examples.

[A] Production of catalysts

Comparative Example 1

(Production Example 1)

Supported Pt/C catalyst 81 g of heat-treated conductive carbon black (Cabot, Vulcan XC-72R) having a specific surface area of 110 m$^2$/g, was slurried in 1,500 ml of deionized water containing 4.0 g of glacial acetic acid. 9.0 g of Pt in the form of H$_2$Pt(OH)$_6$ was dissolved, together with an amine, in 600 ml of an aqueous solution. While the carbon slurry was stirred, the platinum solution was added thereto. 50 g of 5% formic acid as a reducing agent, was gradually added, and the resulting system was gradually heated to about 95° C. The slurry was then maintained at 95° C. for 30 minutes, and then allowed to cool to room temperature. It was filtered and washed with deionized water. The filtration cake was dried in a nitrogen stream at 95° C. for 16 hours. The resulting 10% by weight Pt/C catalyst (C-1*) (the asterisk means a comparative example; the same applies hereinafter) had a metal surface area (MSA) of 120 m$^2$/g.

EXAMPLE 1

Production Example 2

Supported Pt-Co-Ni-Cu (atomic ratio 50:17:17:17) cubic ordered alloy catalyst 50 g of the Pt/C catalyst (C-1*) obtained in Production Example 1 was dispersed in 1,000 ml of deionized water by means of an ultrasonic blender to prepare a slurry. To the slurry being stirred vigorously was added 150 ml of an aqueous solution containing 0.50 g of Co in the form of cobalt (II) nitrate, 0.50 g of Ni in the form of nickel (II) nitrate and 0.54 g of Cu in the form of copper (II) nitrate. A 5% aqueous ammonium hydroxide solution was dropwise added slowly to the resulting slurry to adjust its pH to 8.0. The slurry was stirred for 1 hour and then filtered. The resulting cake was washed with deionized water and dried at 95° C. in a stream of nitrogen. The dried cake was maintained at 900° C. for 1.2 hours in a stream of 7 volume % of hydrogen (the remainder being nitrogen), and then allowed to cool to room temperature to obtain a carbon-supported Pt-Co-Ni-Cu alloy catalyst (C-2). When the powder X-ray diffractometry (CuK ray) was applied to this catalyst, ordering peaks (100) $2\theta = 23.4°$ [appearing as a shoulder of the diffraction peak (002) of graphite of the carbon black carrier] and (110) $2\theta = 33.4°$, which were not seen in the XRD pattern of the catalyst comprising platinum alone (C-1*), appeared at the lower diffraction angle side of the main diffraction peak (111) $2\theta = 41.2°$, and only one peak appeared near $2\theta = 70.2°$ in the (220) diffraction angle region. Accordingly, this product was identified as a L$_{12}$ type cubic ordered alloy. The lattice constant a was 3.791 Å and the crystallite size was 33 Å.

EXAMPLE 2

Production Example 3

Supported Pt-Co-Ni-Cu (atomic ratio 50:17:17:17) face-centered cubic disordered alloy catalyst A carbon-supported Pt-Co-Ni-Cu (atomic ratio 50:17:17:17) alloy catalyst (C-3) was produced in the same manner as in Production Example 2 except that the alloying was effected at 850° C. for 1.2 hours in a stream of 7 volume % of hydrogen (the remainder being nitrogen). The XRD pattern of this catalyst showed no ordered peak at the lower diffraction angle side of (111) $2\theta = 41.2°$. Accordingly, the alloy in C-3 was identified as a face-centered cubic disordered alloy. The lattice constant a of the alloy was 3.794 Å and its crystallite size was 31 Å.

Comparative Example 2

Production Example 4

Supported Pt-Co-Ni-Cu (atomic ratio 50:17:17:17) catalyst

A carbon-supported Pt-Co-Ni-Cu catalyst (C-4*) was produced in the same manner as in Production Example 2 except that Co, Ni and Cu were deposited on Pt/C and then the product was maintained at 500° C. for 2 hours in a stream of nitrogen. The XRD peaks appeared at $2\theta$ (111)=40.4° and $2\theta$ (220)=68.7°. It was shown that although partial alloying took place, as a whole C-4* was in a non-alloyed state, i.e. a state of a Pt/Co/Ni/Cu mixture.

EXAMPLE 3

Production Example 5

Supported Pt-Co-Ni-Cu cubic ordered alloy catalysts

Carbon-supported Pt-Co-Ni-Cu alloy catalysts (C-5 and C-6) having atomic ratios of Pt:Co:Ni:Cu=50:20:20:10 and Pt:Co:Ni:Cu=43:19:19:19, respectively, were produced in the same manner as in Production Example 2 except that the amounts of cobalt (II)

nitrate, nickel (II) nitrate and copper (II) nitrate used were changed. XRD indicated that the supported alloys in C-5 and C-6 were both cubic ordered alloys. The lattic constants and crystallite sizes of the two alloys are shown in Table 1.

EXAMPLE 4

Production Example 6

Supported Pt-Co-Ni-Cu face-centered cubic disordered alloy catalysts

Carbon-supported Pt-Co-Ni-Cu alloy catalysts (C-7 and C 8) having atomic ratios of Pt:Co:Ni:Cu=67:11:11:11 and Pt:Co:Ni:Cu=60:10:10:20, respectively, were produced in the same manner as in Production Example 3 except that the amounts of cobalt (II) nitrate, nickel (II) nitrate and copper (II) nitrate used were changed. XRD indicated that the alloys in C-7 and C-8 were both face-centered cubic disordered alloys.

The lattic constants and crystallite sizes of the two alloys are shown in Table 1.

Comparative Example 3

Production Example 7

Supported Pt-Co-Ni-Cu alloy catalysts

Carbon-supported Pt-Co-Ni-Cu alloy catalysts (C-9*, C-10*, C-11* and C-12*) having Pt:Co:Ni:Cu atomic ratios of 34:22:22:22, 50:30:15:5, 76:8:8:8 and 85:5:5:5, respectively, were produced in the same manner as in Production Example 2 except that the amounts of cobalt (II) nitrate, nickel (II) nitrate and copper (II) nitrate used were changed. XRD indicated that each of the alloys in the catalysts was a face-centered cubic disordered alloy. The lattice constants and crystallite sizes of the alloys are shown in Table 1.

Comparative Example 4

Production Example 8

Supported Pt-Co (atomic ratio=50:50), Pt-Ni (atomic ratio=50:50) and Pt-Cu (atomic ratio=50:50) alloy catalysts A supported Pt-Co (atomic ratio=50:50) alloy catalyst (C-13*) was produced in the same manner as in Production Example 2 except that only Co was deposited on the carbon-supported Pt catalyst (C-1*) by using an aqueous cobalt nitrate solution containing 1.51 g of Co. By XRD was confirmed the formation of a f.c.c. solid solution alloy having a lattice constant a=3.827 and a crystallite size of 32 Å, but showed no ordering peak was detected. Further, a Pt-Ni (atomic ratio=50:50) binary alloy catalyst (C-14*) and a Pt-Cu (atomic ratio=50:50) binary alloy catalyst (C-15*) were produced in the same manner. The alloys in these catalysts were also disordered alloys, and their lattice constants and crystallite sizes are shown in Table 2.

Comparative Example 5

Production Example 9

Supported Pt-Co-Ni (atomic ratio=50:25:25), Pt-Co-Cu (atomic ratio=50:25:25) and Pt-Ni-Cu (atomic ratio=50:25:25) alloy catalysts A supported Pt-Co-Ni (atomic ratio=50:25:25) alloy catalyst (C-16*) was produced in the same manner as in Production Example 2 except that Co and Ni were deposited on the carbon-supported Pt catalyst (C-1*) by using an aqueous solution containing 0.76 g of Co in the form of cobalt (II) nitrate and 0.75 g of Ni in the form of nickel (II) nitrate. By XRD was confirmed the formation of a f.c.c. disordered alloy having a lattice constant a=3.789 Å and a crystallite size of 32 Å.

In the same manner were produced Pt-Co-Cu (atomic ratio=50:25:25) and Pt-Ni-Cu (atomic ratio=50:25:25) ternary alloy catalysts (C-17* and C-18*, respectively). The alloys in these catalysts were both disordered alloys, and their lattice constants and crystallite sizes are shown in Table 2.

Comparative Example 6

Production Example 10

Supported Pt-Cr-Co, Pt-Fe-Co and Pt-Cr-Ga ordered alloy catalysts

A supported Pt-Cr-Co alloy catalyst (C-19*) was produced in the same manner as in Production Example 2 except that Cr and Co were deposited on the supported Pt catalyst (C-1*) by using an aqueous solution containing 0.67 g of Cr in the form of chromium (III) nitrate and 0.76 of Co in the form of cobalt (II) nitrate.

In the same manner were produced a supported Pt-Fe-Co alloy catalyst (C-20*) by using an aqueous solution containing 0.72 g of Fe in the form of iron (III) nitrate and 0.76 g of Co in the form of cobalt (II) nitrate, and a supported Pt-Cr-Ga alloy catalyst (C-21*) by using an aqueous solution containing 0.67 g of Cr in the form of chromium (III) nitrate and 0.90 g of Ga in the form of gallium (III) nitrate.

XRD indicated that each of the alloys in these catalysts was a cubic ordered alloy. The lattice constants and crystallite sizes of the alloys are shown in Table 2.

[B] Production of electrodes

Each of the catalysts obtained in Production Examples 1-10, i.e., C-1*, C-2, C-3, C-4*, C-5 to C-8 and C-9* to C-21*, was dispersed by means of an ultrasonic blender in an aqueous dispersed by means of an ultrasonic wave in an aqueous dispersion of polytetrafluoroethylene (TEFLON ®, TFE-30, a product of Du Pont Company). Aluminum trichloride was added to the resulting slurry to flocculate and precipitate a cotton-like floc.

The cotton-like floc containing the catalyst and polytetrafluoroethylene in a dry weight ratio of 50:50 was spread on a supporting member composed of a graphite paper previously subjected to a water repelling treatment with polytetrafluoroethylene. The resulting material was pressed, dried, and calcined in a nitrogen stream at 350° C. for 15 minutes to obtain electrodes E-1*, E-2, E-3, E-4*, E-5 to E-8 and E-9* to E-21* corresponding to the catalysts C-1*, C-2, C-3, C-4*, C-5 to C-8 and C-9* to C-21*. respectively. These electrodes were produced so that they contained 0.50 mg of Pt per $cm^2$ of the electrode.

These electrodes as well as the catalysts obtained in the foregoing examples and comparative examples were subjected to the following performance tests

[C] Performance tests

I. Test for mass activity for oxygen reduction reaction

Oxygen half cell performance was measured on each of the electrodes E-1*, E-2, E-3, E-4*, E-5 to E-8 and E-9* to E-21*, by passing an oxygen ($O_2$) gas at a flow rate of 600 ml/min over an electrode sample (24 mm in diameter) using 105% phosphoric acid as an electrolyte, at 200° C. A half cell performance curve (I-V curve) of current density vs. internal resistance-free (IR-free, the same applies hereinafter) terminal voltage was obtained. From the curve was determined the current density (mA/cm$^2$) of each of these electrodes at +900 mV vs. RHE. From the current density was determined the mass activity (mA/mg Pt) of each catalyst. The results are shown in Table 3 and 4.

The electrodes of the carbon-supported Pt-Co-Ni-Cu quaternary alloy catalysts within the scope of the present invention (E-2, E-3 and E-5 to E-8) showed 2.2 to 2.3 times as high an activity as the electrode of the platinum alone catalyst (E-1*). These electrodes shows a distinctly higher activity than any one of conventional supported binary or ternary alloy catalyst electrodes, Pt/Co/C (E-13*), Pt-Ni/C (E-14*), Pt-Cu/C (E-15*), Pt-Co-Ni/C (E-16*), Pt-Cr-Co/C (E-19*), Pt-Fe-Co/C (E-20* and Pt-Cr-Ga/C (E-21*), or than any one of ternary alloy catalyst electrodes of other component combinations [e.g. Pt-Co-Cu/C (E-17*) and Pt-Ni-Cu/C (E-18*)]presumed from the conventional catalysts.

The electrode (E-4*) of the Pt-Co-Ni-Cu tetrametalic catalyst of insufficient alloying has a lower activity.

The electrode (E-9*) of the catalyst of Pt-Co-Ni-Cu quaternary alloy in which the proportion of Pt is less than 40 atomic %, the electrodes (E-11* and E-12*) of the catalysts of Pt-Co-Ni-Cu quaternary alloys in which the proportions of Pt are more than 70 atomic %, and the electrode (E-10*) of the catalyst of Pt-Co-Ni-Cu quaternary alloy in which the proportion of Pt is in the range of 40-70 atomic % but the proportion of the second, third or fourth component exceeds the range of 9 to 27 atomic %, showed mass activities at best equivalent to those of conventional binary or ternary alloy catalyst electrodes.

II. Test for electrode stability

A test piece of each of the electrodes E-1*, E-2, E-3, E-4*, E-5 to E-8 and E-9* to E-21* was immersed in 100 ml of 105% phosphoric acid contained in an aging cell. The atmosphere in the cell was purged with nitrogen gas. While a constant voltage of +700 mV (vs. RHE) was applied, the piece was maintained at 200° C. for 50 hours. Then, its EC.MSA was measured and compared with that of the test piece before the treatment. The results are shown in Tables 3 and 4.

The electrodes of the Pt-Co-Ni-Cu alloy catalysts of the present invention, E-2, E-3 and E-5 to E-8, showed at least 1.7 times as much stability [the ratio of the retention (%) of EC.MSA] as the electrode E-1* of the catalyst of Pt alone.

Among the conventional binary or ternary alloy catalysts, only Pt-Co/C (E-13*), Pt-Cu/C (E-15*) and Pt-Fe-Co/C (E-20*) were comparable to the above catalysts.

Among the electrodes of the Pt-Co-Ni-Cu alloy catalysts, those of catalysts in which at least one of the range of 40-70 atomic % for Pt, the range of 9-27 atomic % for Co, the range of 9-27 atomic % for Ni and the range of 9-27 atomic % for Cu is not attained, do not satisfy an EC.MSA retention of 70% (E-10* to E-12*), or even it having an EC.MSA retention of more than 70%, give a very low initial EC.MSA and a low mass activity (E-9*). The electrode of the catalyst which is in the preferable Pt-Co-Ni-Cu composition range of the present invention but is not alloyed, i.e. E-4* has low stability which is equivalent to those of the conventional binary or ternary alloy catalyst electrodes.

III. Test for fuel cell (single cell)

A small-sized single cell (effective electrode area 7.4 cm × 7.4 cm) was assembled by using the electrode E-1* as an anode and each of the electrodes E-1*, E-2, E-15*, E-16*, E-19* and E-20* as a cathode. While feeding hydrogen and air to the anode and cathode, respectively, at a flow rate of 100 ml/min and 600 ml/min at 190° C., the cell was operated at a current density of 160 mA/cm$^2$ for 3,000 hours by using 85% phosphoric acid as an electrolyte.

Figure 3:
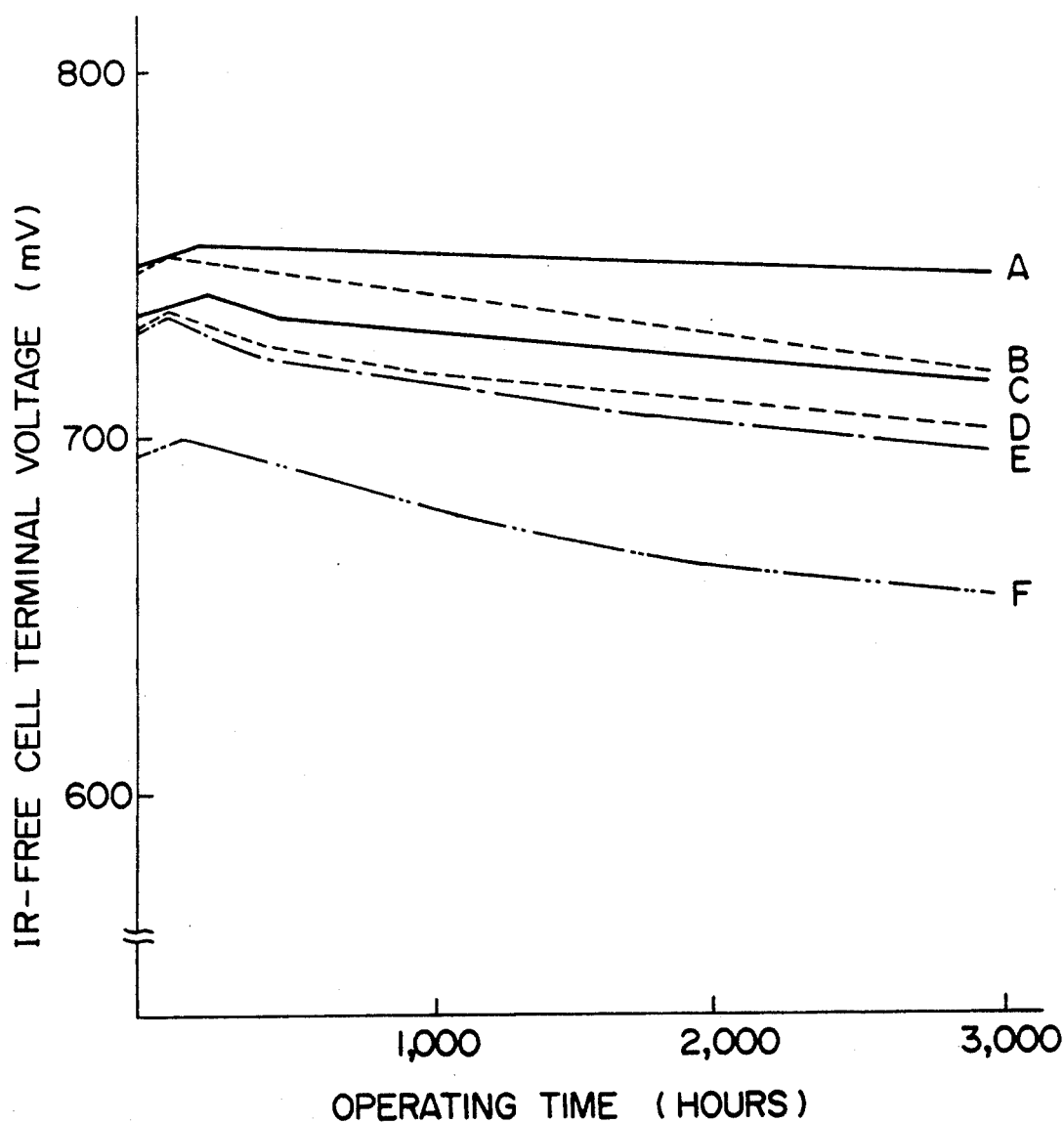
FIG. 3 shows changes with time during an operation of 3,000 hours in the IR-free terminal voltages of single cells using, as the cathode, an electrode containing a supported platinum-cobalt-nickel-copper quaternary alloy catalyst which is within the scope of the present invention, or a conventional electrode containing a catalyst comprising platinum alone or a binary or ternary platinum alloy catalyst.

FIG. 3 shows changes with time in the IR-free cell terminal voltage of each single cell.

The single cell using, as the cathode, the electrode E-2 prepared by using the Pt-Co-Ni-Cu quaternary ordered alloy catalyst of the present invention, showed in its initial performance at 250 hours after the start of operation, a cell terminal voltage higher by 55 mV, 13 mV, 22 mV, 23 mV and 5 mV than the single cells using, as the cathode, the comparative Pt/C electrode (E-1*), Pt-Cu/C electrode (E-15*), Pt-Co-Ni/C electrode (E-16*), Pt-Cr-Co/C electrode (E-19*) and Pt-Fe-Co/C electrode (E-20*), respectively. In addition to the higher initial cell voltage, the single cell using E-2 as the cathode showed a markedly suppressed decay rate of cell voltage of 2.3 mV/1,000 hours, as compared with the decay rates of about 15 mV/1,000 hours of the single cell containing E-1* as the cathode, 5 mV/1,000 hours of the single cell containing E-15* as the cathode and about 10 mV/1,000 hours of the single cells containing E-16*, E-19* and E-20* as the cathode. Accordingly, the difference in terminal voltage between the cathode using the Pt-Co-Ni-Cu quaternary alloy catalyst of the present invention and the cathode using conventional Pt alone catalyst or binary or ternary alloy catalyst, becomes larger with the lapse of a time.

Thus, the Pt-Co-Ni-Cu alloy electrocatalyst of the present invention, when used as a cathode catalyst for fuel cell, shows high performance in both initial activity and life which are superior to those of conventional multi-component alloy catalysts, and has a great economical effect.

TABLE 1

| Properties of supported Pt—Co—Ni—Cu alloy catalysts | | | | | | |
|---|---|---|---|---|---|---|
| Production | | | Solid solution alloy | | Alloy lattice | Crystallite |
| Example No. | Catalyst (atomic ratio) | Catalyst No. | Crystal form | Ordering | constant a(Å) | size by XRD (Å) |
| 2 | Pt—Co—Ni—Cu(50:17:17:17)/C | C-2 | cubic | ordered | 3.791 | 33 |
| 3 | Pt—Co—Ni—Cu(50:17:17:17)/C | C-3 | f.c.c.c | disordered | 3.794 | 31 |
| 5 | Pt—Co—Ni—Cu(50:20:20:10)/C | C-5 | cubic | ordered | 3.789 | 28 |
| 5 | Pt—Co—Ni—Cu(43:19:19:19)/C | C-6 | cubic | ordered | 3.757 | 35 |
| 6 | Pt—Co—Ni—Cu(67:11:11:11)/C | C-7 | f.c.c.c | disordered | 3.849 | 32 |
| 6 | Pt—Co—Ni—Cu(60:10:10:20)/C | C-8 | f.c.c.c | disordered | 3.848 | 34 |
| 4 | Pt—Co—Ni—Cu(50:17:17:17)/C | C-4* | f.c.c.c | disordered | 3.860 | 23 |

TABLE 1-continued

Properties of supported Pt—Co—Ni—Cu alloy catalysts

| Production Example No. | Catalyst (atomic ratio) | Catalyst No. | Solid solution alloy Crystal form | Solid solution alloy Ordering | Alloy lattice constant a(Å) | Crystallite size by XRD (Å) |
|---|---|---|---|---|---|---|
| 7 | Pt—Co—Ni—Cu(34:22:22:22)/C | C-9* | f.c.c.c | disordered | 3.735 | 36 |
| 7 | Pt—Co—Ni—Cu(50:30:15:5)/C | C-10* | f.c.c.c | disordered | 3.798 | 27 |
| 7 | Pt—Co—Ni—Cu(76:8:8:8)/C | C-11* | f.c.c.c | disordered | 3.866 | 36 |
| 7 | Pt—Co—Ni—Cu(85:5:5:5)/C | C-12* | f.c.c.c | disordered | 3.901 | 35 |

TABLE

Properties of supported platinum catalyst and supported platinum binary or ternary alloy catalysts

| Production Example No. | Catalyst (atomic ratio) | Catalyst No. | Solid solution alloy Crystal form | Solid solution alloy Ordering | Alloy lattice constant a(Å) | Crystallite size by XRD (Å) |
|---|---|---|---|---|---|---|
| 1 | Pt/C | C-1* | F.c.c | | 3.923 | 23 |
| 8 | Pt—Co(50:50)/C | C-13* | f.c.c. | disordered | 3.827 | 32 |
| 8 | Pt—Ni(50:50)/C | C-14* | f.c.c. | disordered | 3.786 | 26 |
| 8 | Pt—Cu(50:50)/C | C-15* | F.c.c. | ordered | 3.794 | 37 |
| 9 | Pt—Co—Ni(50:25:25)/C | C-16* | f.c.c. | disordered | 3.789 | 32 |
| 9 | Pt—Co—Cu(50:25:25)/C | C-17* | f.c.c. | disordered | 3.808 | 34 |
| 9 | Pt—Co—Cu(50:25:25)/C | C-18* | f.c.c. | disordered | 3.799 | 40 |
| 10 | Pt—Cr—Co(50:25:25)/C | C-19* | cubic | ordered | 3.827 | 36 |
| 10 | Pt—Fe—Co(50:25:25)/C | C-20* | cubic | ordered | 3.817 | 35 |
| 10 | Pt—Cr—Ga(50:25:25)/C | C-21* | cubic | ordered | 3.860 | 35 |

TABLE 3

Oxygen reduction mass activities and EC.MSA retention of supported Pt—Co—Ni—Cu alloy catalysts

| Eelctrode | Catalyst | Oxygen Reduction mass activity (m$^A$/mg Pt) | EC.MSA (m$^2$/g Pt) Before testing | EC.MSA (m$^2$/g Pt) 200° C., + 0.7 V after 5 hours | Retention (%) |
|---|---|---|---|---|---|
| E-2 | Pt—Co—Ni—Cu/C | 88 | 82 | 60 | 73 |
| E-3 | Pt—Co—Ni—Cu/C | 90 | 89 | 62 | 70 |
| E-5 | Pt—Co—Ni—Cu/C | 92 | 95 | 67 | 71 |
| E-6 | Pt—Co—Ni—Cu/C | 88 | 78 | 58 | 74 |
| E-7 | Pt—Co—Ni—Cu/C | 86 | 96 | 67 | 70 |
| E-8 | Pt—Co—Ni—Cu/C | 90 | 90 | 64 | 71 |
| E-4* | Pt—Co—Ni—Cu/C | 48 | 86 | 57 | 66 |
| E-9* | Pt—Co—Ni—Cu/C | 74 | 79 | 63 | 80 |
| E-10* | Pt—Co—Ni—Cu/C | 70 | 98 | 63 | 64 |
| E-11* | Pt—Co—Ni—Cu/C | 77 | 106 | 69 | 65 |
| E-12* | Pt—Co—Ni—Cu/C | 64 | 101 | 69 | 68 |

TABLE 4

Oxygen reduction mass activities and EC.MSA retention of supported Pt catalyst and supported Pt multi-component alloy catalyst

| Eelctrode | Catalyst | Oxygen Reduction mass activity (m$^A$/mg Pt) | EC.MSA (m$^2$/g Pt) Before testing | EC.MSA (m$^2$/g Pt) 200° C., + 0.7 V after 5 hours | Retention (%) |
|---|---|---|---|---|---|
| E-1* | Pt/C | 40 | 120 | 48 | 40 |
| E-13* | Pt—Co/C | 46 | 91 | 65 | 71 |
| E-14* | Pt—Ni/C | 52 | 102 | 62 | 61 |
| E-15* | Pt—Cu/C | 82 | 82 | 58 | 70 |
| E-16* | Pt—Co—Ni/C | 79 | 88 | 56 | 64 |
| E-17* | Pt—CO—Cu/C | 68 | 80 | 46 | 58 |
| E-18* | Pt—Ni—Cu/C | 66 | 78 | 53 | 68 |
| E-19* | Pt—Cr—Co/C | 64 | 77 | 57 | 66 |
| E-20* | Pt—Fe—Co/C | 84 | 82 | 58 | 70 |
| E-21* | Pt—Cr—Ga/C | 73 | 90 | 54 | 60 |

What is claimed is:

1. A platinum alloy electrocatalyst comprising an electrically conductive carrier and a platinum-cobalt-nickel-copper quaternary solid solution alloy dispersed in and deposited on the carrier, composed of 40-70 atomic % of platinum, 9-27 atomic % of cobalt, 9-27 atomic % of nickel and 9-27 atomic % of copper.

2. The platinum alloy electrocatalyst of claim 1 in which the platinum-cobalt-nickel-copper quaternary solid solution alloy has a cubic ordered alloy structure.

3. The platinum alloy electrocatalyst of claim 1 in which the platinum-cobalt-nickel-copper quaternary solid solution alloy is deposited on an electrically conductive carbon powder in a highly dispersed state with an average crystallite size of not more than 60 Å.

4. An electrode for acid electrolyte fuel cell, said electrode comprising a platinum alloy electrocatalyst, a water-repellent binder and an electrically conductive and acid-resistant supporting member to which the electrocatalyst and the binder are bonded, said electrocatalyst comprising an electrically conductive carbon powder carrier and a platinum-cobalt-nickel-copper quaternary solid solution alloy dispersed in and deposited on the carrier, composed of 40-70 atomic % of platinum, 9-27 atomic % of cobalt, 9-27 atomic % of nickel and 9-27 atomic % of copper.

5. The electrode of claim 4 in which the platinum-cobalt-nickel-copper quaternary solid solution alloy has a cubic ordered alloy structure.

6. The electrode of claim 4 in which the platinum-cobalt-nickel-copper quaternary solid solution alloy is deposited on the electrically conductive carbon powder carrier in a highly dispersed state with an average crystallite size of not more than 60 Å.

* * * * *